UNITED STATES PATENT OFFICE.

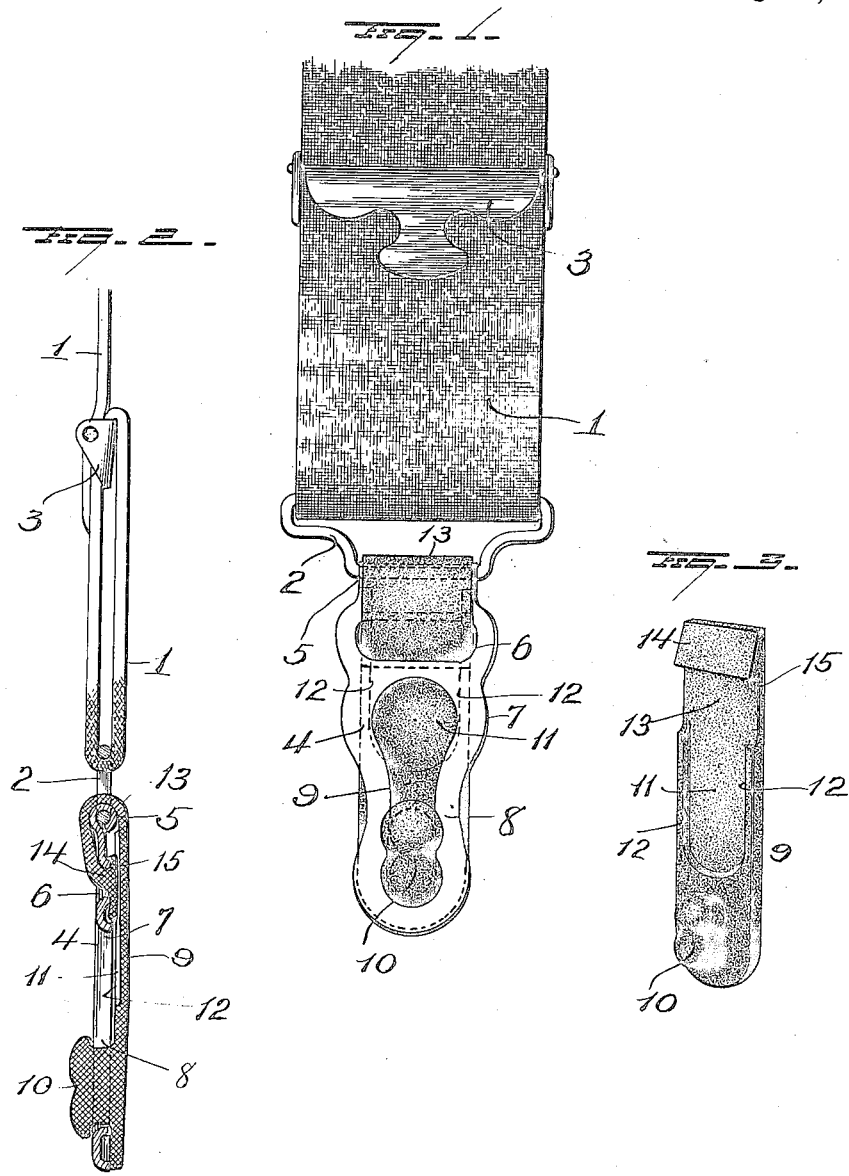

MICHAEL HAWIE, OF BRIDGEPORT, CONNECTICUT.

HOSE SUPPORTER.

1,426,636.  Specification of Letters Patent.  Patented Aug. 22, 1922.

Application filed June 22, 1922. Serial No. 570,076.

*To all whom it may concern:*

Be it known that I, MICHAEL HAWIE, a citizen of the United States, and a resident of Bridgeport, in the county of Fairfield and State of Connecticut, have invented certain new and useful Improvements in Hose Supporters; and I do hereby declare the following to be a full, clear, and exact description of the invention, such as will enable others skilled in the art to which it appertains to make and use the same.

This invention relates to improvements in hose supporters and more particularly to such as are especially adapted for use with corsets, although my improvements are also applicable for use with hose supporters generally.

One object of my present invention is to provide a simple and efficient flexible clasp member co-operable with the metal loop or frame of hose attaching devices, which may be easily, quickly and effectually connected with said metal loop or frame without the employment of fastening means such as eyelets, rivets or stitching.

A further object is to provide hose attaching means for a hose supporter, which shall comprise a metal loop or frame member and a rubber clasp member, the latter being attachable to the loop or frame member without the use of fastening devices passing through the rubber or the metal member of the structure, and to so construct the rubber clasp member that it shall, in co-operation with the loop or frame member, firmly grip the hose; so that it shall be capable of successfully withstanding all strains to which it may be subjected, and so that it shall, at the same time, have sufficient flexibility where flexing is necessary to insure ready manipulation in attaching the supporter to hose or removing the same therefrom.

With these and other objects in view, the invention consists in certain novel features of construction as hereinafter set forth and pointed out in the claims.

In the accompanying drawings, Figure 1 is a front view showing an embodiment of my invention. Figure 2 is a sectional view, and Figure 3 is a separate view of the rubber clamp member.

In the drawings, I have shown at 1 a portion of the webbing of a hose supporter with which my improvements are connected through the medium of a wire loop 2 and adjustment of the webbing being effected by means of a buckle 3 of any preferred construction.

The hose attaching devices may include a metal loop or frame 4 (which may be constructed either of sheet metal or wire) and the upper portion of said loop or frame may be formed with a sleeve 5 whereby it is connected with the wire loop 2. The frame or loop 4 is provided near its upper end with a transverse slot 6 and the opening in said frame or loop is made with a comparatively large portion 7 and a contracted lower portion 8 to receive the button portion of a clasp 9 and effect connection of the attaching means to hose as will be readily understood.

The clasp member 9 is made of soft rubber or similar flexible material, from one face of the lower portion of which, the button portion 10 of the clasp projects. In the embodiment of the invention shown in the drawings, this button portion comprises two members in close proximity to each other and may be made of rubber, integral with the body portion of the clasp. Above that portion of the clasp from which the button member projects, the clasp is recessed in one face as indicated at 11, leaving side flanges 12 which terminate at their upper ends appreciable distances from the upper end of the clasp to provide a more flexible portion 13 in proximity to the upper extremity of said clasp and thus permit ready bending or folding of this portion of the clasp. At its upper end or in proximity to said upper end, the clasp is made with a thickened portion 14 providing a shoulder 15 extending transversely of said clasp.

In assembling the clasp and metal frame or loop, the shouldered end portion of the clasp will be passed through the transverse slot 6 of the metal frame or loop 4 and the shoulder 15 caused to engage the latter at the upper side of said slot. The clasp may be then passed through the wire loop 2 and caused to engage over the upper end of the loop or frame 4 so that the main portion of the clasp will be disposed approximately parallel with the loop or frame and the flexibility of said clasp will permit its ready co-operation with the loop or frame for connecting the devices with the hose.

Having fully described my invention what I claim as new and desire to secure by Letters Patent, is:

1. Attaching means for a hose supporter comprising a rigid loop member and a flexible clasp member cooperable therewith, said clasp member provided with an imperforate part having interlocking connection at its upper portion with the upper portion of the loop or frame member.

2. Attaching means for a hose supporter comprising a rigid loop or frame member and a flexible clasp member co-operable therewith, said clasp member provided near its upper end with an imperforate shouldered portion to engage and interlock with the upper portion of the loop or frame member.

3. Attaching means for a hose supporter comprising a rigid loop or frame member provided near its upper end with an opening and a flexible clasp member co-operable with said loop or frame member, said flexible clasp member having a part overlying the upper end portion of the loop or frame member and passing through the opening in the latter and provided with a shoulder engaging the loop or frame member adjacent to the slot therein.

4. In hose attaching means, a flexible clasp member provided near one end with a button member and near its other end with an imperforate part having a transverse shoulder to provide means for interlocking said flexible clasp with a loop member.

5. In hose attaching means, a flexible clasp member having a button member near one end and a transverse shoulder near the other end, the intermediate portion of said member being recessed in one face forming side flanges which terminate appreciable distances from the shouldered portion of the clasp.

In testimony whereof, I have signed this specification in the presence of two subscribing witnesses.

MICHAEL HAWIE.

Witnesses:
A. LEIPNER,
GEORGE MORRIS.